US012456593B2

(12) United States Patent
Hemnani et al.

(10) Patent No.: US 12,456,593 B2
(45) Date of Patent: Oct. 28, 2025

(54) CONTACTOR WITH HEAT TRANSFER DEVICE

(71) Applicants: TE Connectivity Services GmbH, Schaffhausen (CH); TE CONNECTIVITY BRASIL INDUSTRIA DE ELECTRONICOS LTDA, Braganca Paulista (BR)

(72) Inventors: Dinesh Loku Hemnani, Greensboro, NC (US); Albert Yong Lee, Greensboro, NC (US); Amadeu Luiz Fazani Cavallieri, Sao Paulo (BR); Bruce Toepfer, High Point, NC (US); Nathan Philip Myer, Lancaster, PA (US); Ram Kishore Venkatesan, Middletown, PA (US); William A. Russell, Jr., Walkertown, NC (US)

(73) Assignee: TE Connectivity Solutions GmbH (CH)

( * ) Notice: Subject to any disclaimer, the term of this patent is extended or adjusted under 35 U.S.C. 154(b) by 733 days.

(21) Appl. No.: 17/688,871

(22) Filed: Mar. 7, 2022

(65) Prior Publication Data

US 2022/0293355 A1 Sep. 15, 2022

Related U.S. Application Data

(60) Provisional application No. 63/158,916, filed on Mar. 10, 2021.

(51) Int. Cl.
*H01H 9/52* (2006.01)
*H01H 1/14* (2006.01)
(Continued)

(52) U.S. Cl.
CPC ................ *H01H 9/52* (2013.01); *H01H 1/14* (2013.01); *H01H 1/62* (2013.01); *H01H 9/02* (2013.01);
(Continued)

(58) Field of Classification Search
CPC .. H01H 9/52; H01H 1/14; H01H 1/62; H01H 9/02; H01H 45/12; H01H 2009/523; H01H 50/12; H01H 50/54
See application file for complete search history.

(56) References Cited

U.S. PATENT DOCUMENTS

| | | | | |
|---|---|---|---|---|
| 10,262,810 B1 * | 4/2019 | Burkman | ................. | H01H 1/50 |
| 10,756,498 B1 * | 8/2020 | Sarraf | .................. | H01M 50/50 |

FOREIGN PATENT DOCUMENTS

| | | | | |
|---|---|---|---|---|
| JP | 7127487 B2 * | 8/2022 | ............. | H01H 50/12 |
| KR | 20160055905 A * | 5/2016 | ............. | H01H 37/72 |

* cited by examiner

*Primary Examiner* — Mohamad A Musleh

(57) ABSTRACT

A contactor includes a housing defining a cavity. The contactor includes a switch assembly received in the cavity. The switch assembly includes first and second fixed contacts received in the cavity and a movable contact movable within the cavity between a mated position and an unmated position. The movable contact engages the first and second fixed contacts to electrically connect the first and second fixed contacts in the mated position. The switch assembly includes a coil assembly in the cavity operated to move the movable contact between the unmated position and the mating position. The contactor includes a heat transfer device coupled to the housing. The heat transfer device is thermally coupled to the first fixed contact and the second fixed contact to dissipate heat from the first fixed contact and the second fixed contact.

20 Claims, 10 Drawing Sheets

(51) Int. Cl.
*H01H 1/62* (2006.01)
*H01H 9/02* (2006.01)
*H01H 45/12* (2006.01)
(52) U.S. Cl.
CPC ....... *H01H 45/12* (2013.01); *H01H 2009/523* (2013.01)

CONTACTOR WITH HEAT TRANSFER DEVICE

CROSS-REFERENCE TO RELATED APPLICATIONS

This application claims priority to U.S. Provisional Application No. 63/158,916, filed 10 Mar. 2021, titled "CONTACTOR WITH HEAT TRANSFER DEVICE," which is incorporated by reference herein in its entirety.

BACKGROUND OF THE INVENTION

The subject matter herein relates generally to contactors.

Certain electrical applications, such as HVAC, power supply, locomotives, elevator control, motor control, aerospace applications, electric vehicles, hybrid electric vehicles, fuel-cell vehicles, charging systems, and the like, utilize electrical contactors to control power distribution for the devices. For example, vehicles using a high-voltage battery pack generally include a contactor to switch battery power to the power electronic components. There is a desire to increase current carrying capacity through components of the contactor. However, an increase in current leads to overheating of the components of the contactor.

A need remains for a contactor having high current carrying capacity.

BRIEF DESCRIPTION OF THE INVENTION

In one embodiment, a contactor is provided. The contactor includes a housing having an outer wall defining a cavity. The housing has a first end and a second end opposite the first end. The contactor includes a switch assembly received in the cavity. The switch assembly includes a first fixed contact received in the cavity and a second fixed contact received in the cavity. The switch assembly includes a movable contact movable within the cavity between a mated position and an unmated position. The movable contact engages the first and second fixed contacts to electrically connect the first and second fixed contacts in the mated position. The switch assembly includes a coil assembly in the cavity operated to move the movable contact between the unmated position and the mating position. The contactor includes a heat transfer device coupled to the housing. The heat transfer device is thermally coupled to the first fixed contact and the second fixed contact to dissipate heat from the first fixed contact and the second fixed contact.

In a further embodiment, a contactor is provided. The contactor includes a housing having an outer wall defining a cavity. The housing has a first end and a second end opposite the first end. The contactor includes a switch assembly received in the cavity. The switch assembly includes a first fixed contact received in the cavity and a second fixed contact received in the cavity. The switch assembly includes a movable contact movable within the cavity between a mated position and an unmated position. The movable contact engages the first and second fixed contacts to electrically connect the first and second fixed contacts in the mated position. The switch assembly includes a coil assembly in the cavity operated to move the movable contact between the unmated position and the mating position. The contactor includes a heat transfer device coupled to the housing. The heat transfer device includes a cold plate has a coolant channel therethrough. The cold plate includes a thermal interface thermally coupled to the first fixed contact and the second fixed contact to dissipate heat from the first fixed contact and the second fixed contact with aid of coolant fluid flowing through the coolant channel.

In another embodiment, a contactor is provided. The contactor includes a housing having an outer wall defining a cavity. The housing has a first end and a second end opposite the first end. The contactor includes a switch assembly received in the cavity. The switch assembly includes a first fixed contact received in the cavity and a second fixed contact received in the cavity. The switch assembly includes a movable contact movable within the cavity between a mated position and an unmated position. The movable contact engages the first and second fixed contacts to electrically connect the first and second fixed contacts in the mated position. The switch assembly includes a coil assembly in the cavity operated to move the movable contact between the unmated position and the mating position. The contactor includes a heat transfer device coupled to the housing. The heat transfer device includes a peltier device has a thermal interface thermally coupled to the first fixed contact and the second fixed contact. The peltier device uses thermoelectric cooling to dissipate heat from the first fixed contact and the second fixed contact.

DETAILED DESCRIPTION OF THE INVENTION

Figure 1:
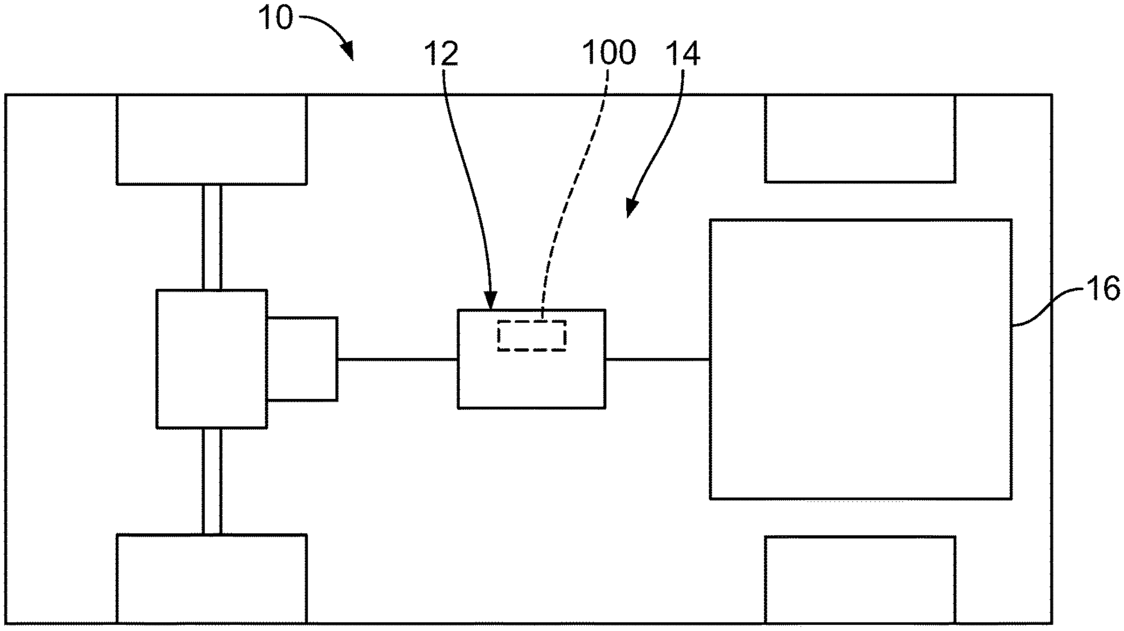
FIG. 1 is a schematic illustration of a vehicle having a contactor in accordance with an exemplary embodiment.

FIG. 1 is a schematic illustration of a vehicle 10 having a power distribution unit 12 in accordance with an exemplary embodiment. The vehicle 10 may be an electric vehicle. In other various embodiments, the vehicle 10 may be a hybrid electric vehicle, such as including an engine (not shown). The vehicle 10 includes a vehicle battery system 14 for supplying power for the vehicle 10. The power distribution unit 12 is part of the vehicle battery system 14. The vehicle battery system 14 includes a battery pack 16, such as a high voltage battery pack for powering the electric motor of the vehicle 10. The battery pack 16 provides a high voltage DC output. The battery pack 16 is electrically connected to the power distribution unit 12. The power distribution unit 12 includes a contactor 100 in accordance with an exemplary embodiment for controlling power supply through the power distribution unit 12. The contactor 100 is an electrical switch or relay that safely connects and disconnects one or more electrical circuits to protect the flow of power through the system. The contactor 100 may be used in other various applications other than the vehicle, such as HVAC, power supply, locomotives, elevator control, motor control, aerospace applications, charging systems, and the like.

Figure 2:
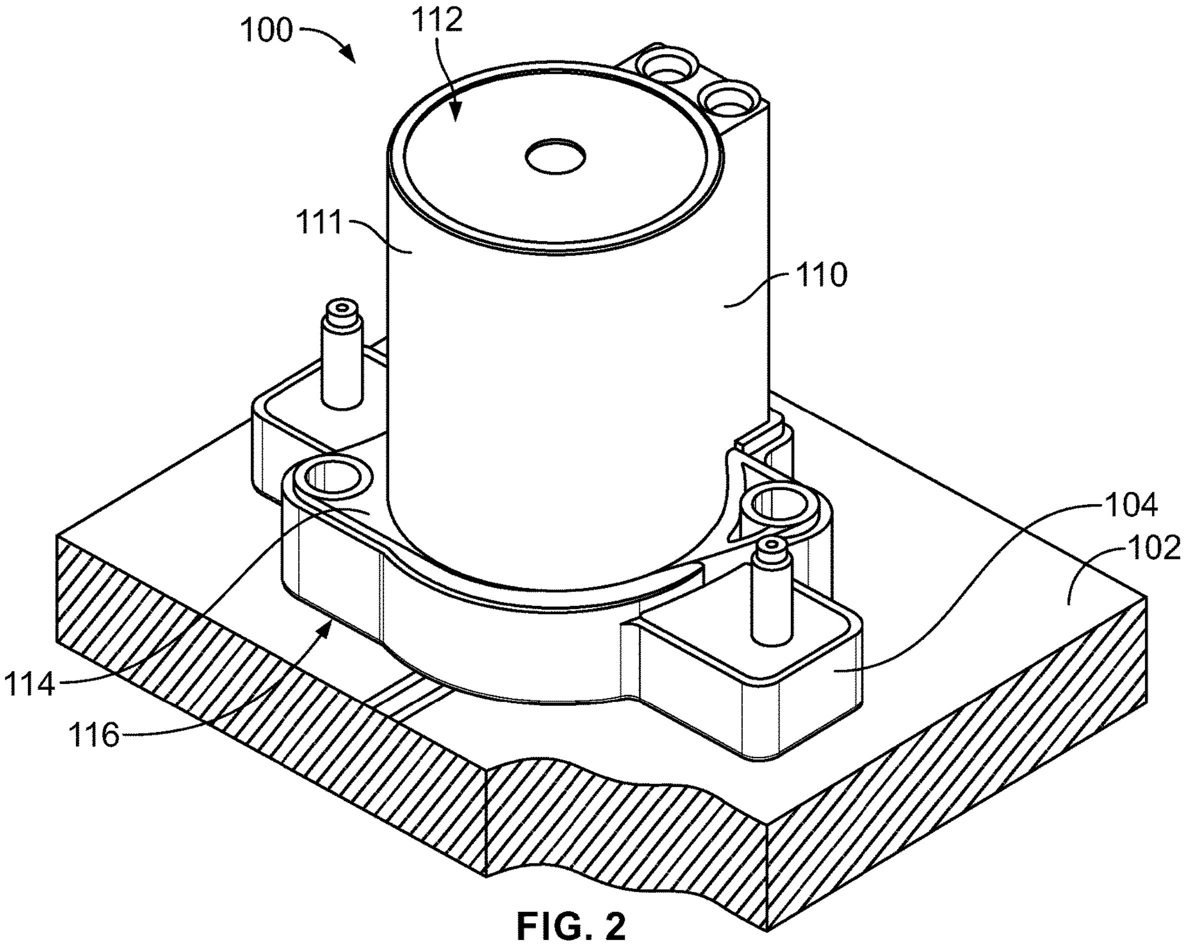
FIG. 2 is a perspective view of the contactor in accordance with an exemplary embodiment.

FIG. 2 is a perspective view of the contactor 100 in accordance with an exemplary embodiment. The contactor 100 includes a housing 110 having an outer wall 111 surrounding a cavity 112. The housing 110 may be a multi-piece housing in various embodiments. The housing 110 includes a base 114, such as at a bottom 116 of the contactor 100, configured to be coupled to a mounting structure 102. For example, the base 114 may include mounting brackets for securing the contactor 100 to the mounting structure 102, such as using fasteners. In an exemplary embodiment, the mounting structure 102 may be a thermal ground, such as a heat sink for dissipating heat from the contactor 100. The mounting structure 102 may be part of the battery pack 16 (shown in FIG. 1). For example, the mounting structure 102 may be a heat dissipating component of the battery pack 16, such as a liquid cooled battery tray or a finned heat sink configured to be air cooled.

In an exemplary embodiment, the contactor 100 includes a cover 104 coupled to the housing 110 for closing the cavity 112. The cover 104 may be coupled to the bottom 116 of the contactor 100, such as to the base 114. Optionally, the cover 104 may be sealed to the housing 110. In various embodiments, the cover 104 is manufactured from a thermally conductive material. The cover 104 is thermally coupled to the mounting structure 102. The cover 104 dissipates heat from internal components of the contactor 100 to the mounting structure 102, where the heat is transferred away from the cover 104 and the contactor 100. Optionally, outer wall 111 of the housing 110 above the base 114 may be cylindrical defining a cylindrical cavity 112 in various embodiments.

Figure 3:
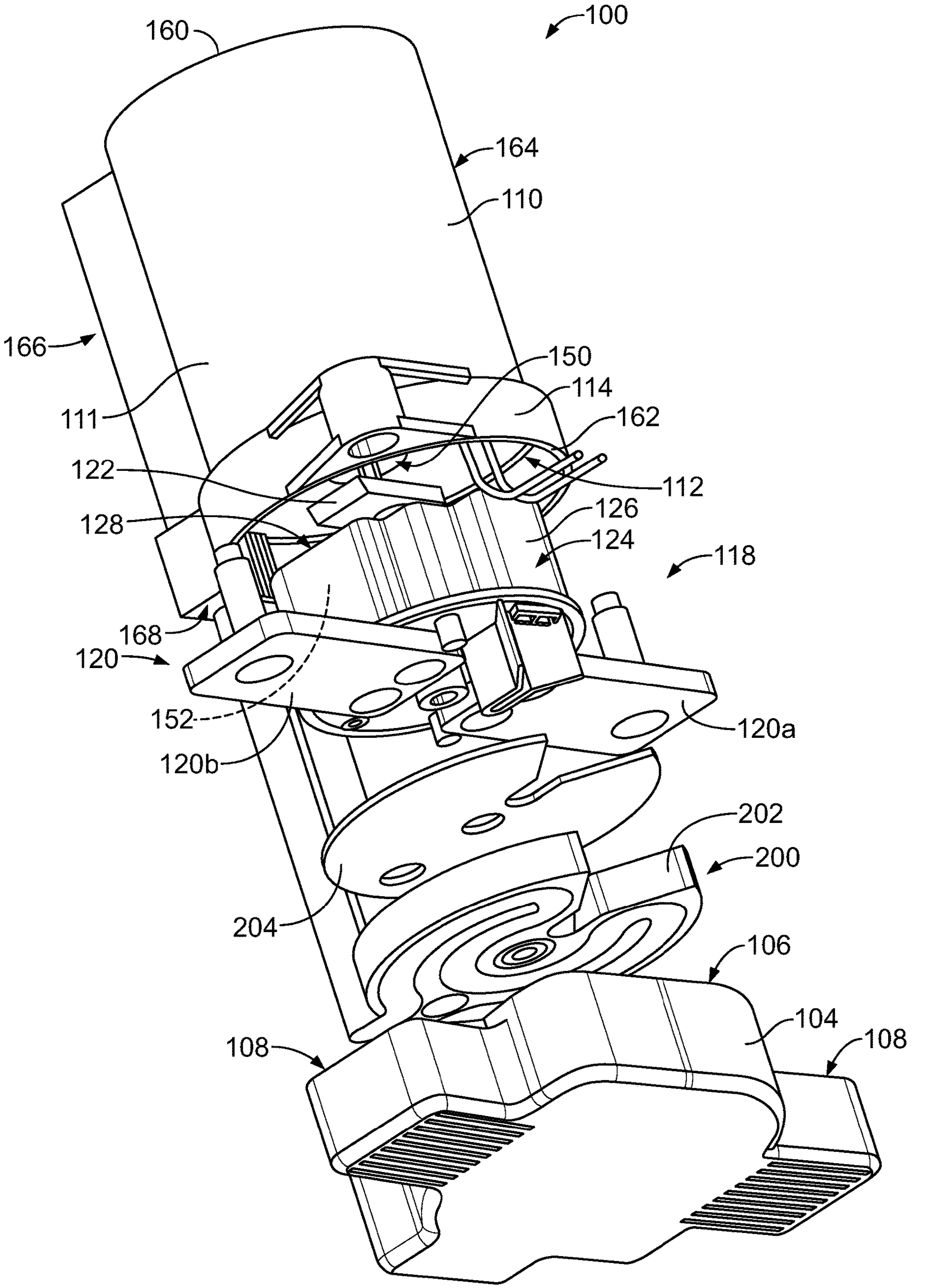
FIG. 3 is a bottom perspective, exploded view of the contactor in accordance with an exemplary embodiment.

FIG. 3 is a bottom perspective, exploded view of the contactor 100 in accordance with an exemplary embodiment. The contactor 100 includes the housing 110 having the outer wall 111 forming the cavity 112. The contactor 100 includes a switch assembly 118 received in the housing 110. The switch assembly 118 is configured to perform switching functions to safely connect and disconnect one or more electrical circuits to protect the flow of power through the contactor 100. The cover 104 encloses the switch assembly 118 in the cavity 112. In an exemplary embodiment, the contactor 100 includes a heat transfer device 200 for dissipating heat from the switch assembly 118 of the contactor 100. The heat transfer device 200 may be an active cooling component, such as using liquid cooling or thermoelectric cooling to dissipate heat from the switch assembly 118. In other various embodiments, the heat transfer device 200 may be a passive cooling device.

The switch assembly 118 of the contactor 100 includes fixed contacts 120 received in the cavity 112 and a movable contact 122 movable within the cavity 112 between a mated position and an unmated position. The movable contact 122 engages the fixed contacts 120 to electrically connect the fixed contacts 120 in the mated position. In the illustrated embodiment, the contactor 100 includes first and second fixed contacts 120*a*, 120*b*. The fixed contacts 120 are fixed to the housing 110. For example, the fixed contacts 120 may be coupled to the base 114 and/or the cover 104. In other various embodiments, the fixed contacts 120 may be coupled to an insert 124 of the housing 110 inserted into the cavity 112. The insert 124 may be removable from the cavity 112 when the cover 104 is removed from the base 114. In an exemplary embodiment, the insert 124 of the housing 110 includes a contact holder 126 configured to hold the fixed contacts 120. The contact holder 126 defines an enclosure 128. The fixed contacts 120 extend into the enclosure 128. The movable contact 122 is located in the enclosure 128. The outer wall 111 surrounds the contact holder 126 and the enclosure 128.

The switch assembly 118 of the contactor 100 includes a coil assembly 150 in the cavity 112 operated to move the movable contact 122 between the unmated position and the mated position. In an exemplary embodiment, the coil assembly 150 is an electromagnet for actuating the movable contact 122. The coil assembly 150 moves the movable contact 122 to the mated position with the coil assembly 150 is energized and moves the movable contact 122 to the unmated position when the coil assembly 150 is deenergized.

In an exemplary embodiment, the contactor 100 includes an arc suppressor 152 for suppressing electrical arc of the electrical circuit. The arc suppressor 152 is located in the cavity 112 of the housing 110. Optionally, the arc suppressor 152 may be located in the contact holder 126, such as in or near the enclosure 128. In an exemplary embodiment, the arc suppressor 152 includes magnets creating magnetic fields in the enclosure 128 for suppressing arc created between the movable contact 122 and the fixed contacts 120. In an exemplary embodiment, the contact holder 126 may be sealed and may be filled with an inert gas for arc suppression.

The housing 110 holds the components of the contactor 100. The housing 110 includes a first end 160 and a second end 162 opposite the first end 160. The first end 160 may be a top of the housing 110 and the second end 162 may be a bottom of the housing 110. The housing 110 includes a first side 164 and a second side 166 opposite the first side 164. The housing 110 may include a secondary cavity 168 at the second side 166. The secondary cavity 168 may receive part of the heat transfer device 200. In the illustrated embodiment, the main cavity 112 is open at the second end 162. The cover 104 is coupled to the housing 110 at the second end 162 to close the main cavity 112.

The heat transfer device 200 is incorporated into the contactor 100 to dissipate heat from components of the contactor 100. The reduction in operating temperature of the components of the contactor 100 allows for increased current carrying capacity of the contactor 100. The heat transfer device 200 is configured to be thermally coupled to the first fixed contact 120*a* and the second fixed contact 120*b* to dissipate heat from the first and second fixed contacts 120*a*, 120*b*, which in turn lower the operating temperature of the movable contact 122. The heat transfer device 200 may directly interface with the first and second fixed contacts 120*a*, 120*b* to dissipate heat from the first and second fixed contacts 120*a*, 120*b*. Alternatively, the heat transfer device 200 may be indirectly thermally coupled to the first and second fixed contacts 120*a*, 120*b*, such as through an intermediary thermal component, such as the cover 104.

In an exemplary embodiment, the heat transfer device 200 includes a thermal conductor 202 and a thermally conductive isolator 204 between the thermal conductor 202 and the first and second fixed contacts 120*a*, 120*b*. In an exemplary embodiment, the thermal conductor 202 is a cold plate having cooling channels for active cooling by liquid coolant circulated through the thermal conductor 202. In other various embodiments, the thermal conductor 202 may include a thermoelectric cooling device, such as a peltier device for cooling the fixed contacts 120. In other various embodiments, the thermal conductor 202 includes thermal inserts used for passively cooling the fixed contacts 120, such as via conduction, convection and/or radiation. In the illustrated embodiment, the thermal conductor 202 is a single component configured to cool both the first and second fixed contacts 120*a*, 120*b*. However, in alternative embodiments, the thermal conductor 202 may have multiple components, such as a first component for cooling the first fixed contact 120*a* and a second component for cooling the second fixed contacts 120*b*.

The thermally conductive isolator 204 is electrically insulative to prevent short circuiting of the first and second fixed contacts 120*a*, 120*b*. In an exemplary embodiment, the thermally conductive isolator 204 is a metal oxide insulator. For example, the thermally conductive isolator 204 may be a ceramic pad. In other various embodiments, the thermally conductive isolator 204 may be a polymeric pad having thermally conductive fillers, such as metal particles, embedded in the polymeric pad to increase thermal conductivity. Other types of thermally conductive isolators may be used in alternative embodiments, such as aluminum nitride, boron nitride, alumina, mica. The thermally conductive isolator 204 may be a sheet or pad having a predefined shape. For example, the thermally conductive isolator 204 may be disc-shaped. In alternative embodiments, the thermally conductive isolator 204 may be an epoxy or gel applied to the surfaces of the fixed contacts 120 and/or the thermal conductor 202. In various embodiments, the thermally conductive isolator 204 may form a heat spreader. For example, the thermally conductive isolator 204 may be a homogenous material allowing heat to spread in all directions (for example, both vertically between the thermal conductor 202 and the fixed contacts 120 as well as horizontally, such as radiating outward from the hot zones of the fixed contacts 120). As such, the thermally conductive isolator 204 may efficiently transfer heat between the fixed contacts 120 and the thermal conductor 202. In an exemplary embodiment, the thermally conductive isolator 204 has a thermal conductivity (W/mK) greater than 10× a thermal conductivity of the plastic material of the housing 110. For example, the housing 110 may have a thermal conductivity of less than 1.0 W/mK while the thermally conductive isolator 204 may have a thermal conductivity of greater than 10.0 W/mK, and in some cases may be greater than 20.0 W/mK, and in even some other cases may be greater than 100.0 W/mK.

In an exemplary embodiment, the cover 104 includes a main pocket 106 that receives the heat transfer device 200. The cover 104 may include additional pockets 108 that receive the fixed contacts 120. The cover 104 holds the heat transfer device 200 relative to the fixed contacts 120. In an exemplary embodiment, the cover 104 is highly thermally conductive to help dissipate heat from the contactor 100. For example, the cover 104 may be manufactured from a metal oxide, such as a ceramic. In other various embodiments, the cover 104 may be manufactured from a polymeric material having thermally conductive fillers, such as metal particles, embedded in the polymeric material to increase thermal conductivity. In an exemplary embodiment, the cover 104 has a thermal conductivity (W/mK) greater than 10× a thermal conductivity of the plastic material of the housing 110. The cover 104 may have a thermal conductivity (W/mK) similar to the thermal conductivity of the thermal conductor 202.

Figure 4:
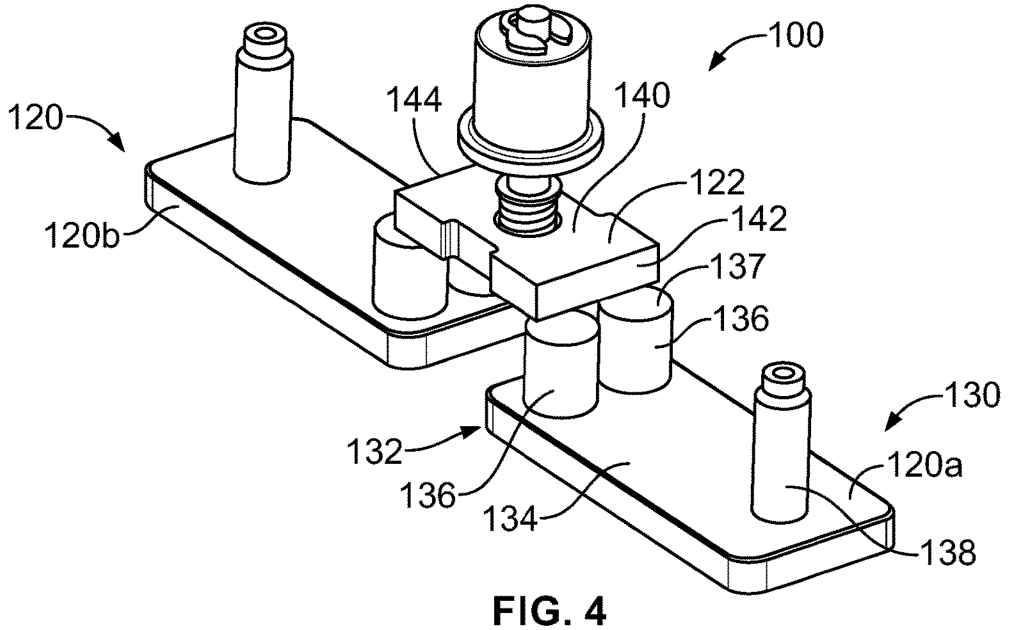
FIG. 4 is a top perspective view of a portion of a switch assembly of the contactor in accordance with an exemplary embodiment.
Figure 5:
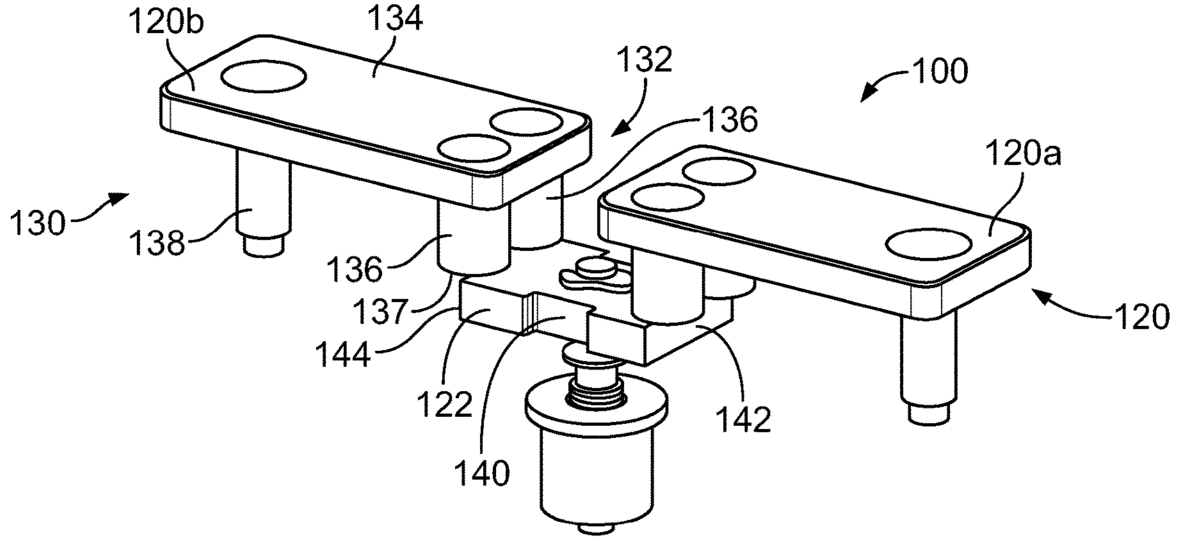
FIG. 5 is a bottom perspective view of a portion of the switch assembly in accordance with an exemplary embodiment.
Figure 6:
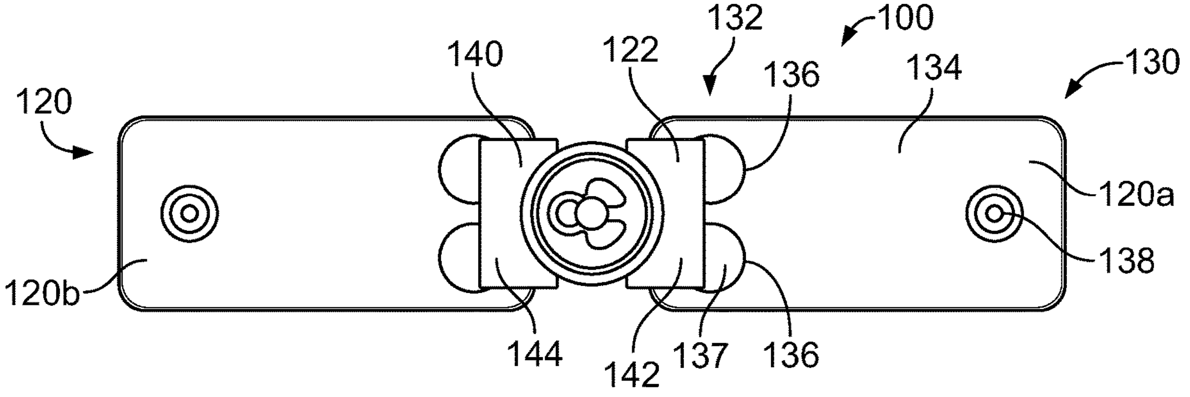
FIG. 6 is a top view of a portion of the switch assembly in accordance with an exemplary embodiment.

FIG. 4 is a top perspective view of a portion of the switch assembly 118 in accordance with an exemplary embodiment. FIG. 5 is a bottom perspective view of a portion of the switch assembly 118 in accordance with an exemplary embodiment. FIG. 6 is a top view of a portion of the switch assembly 118 in accordance with an exemplary embodiment. FIGS. 4-6 illustrate the fixed contacts 120 and the movable contact 122.

The fixed contacts 120 each include a terminating end 130 and a mating end 132. The terminating end 130 is configured to be terminated to another component, such as a wire or a terminal, such as a line in or a line out wire. In an exemplary embodiment, the terminating end 130 is exposed at the exterior of the contactor 100 for terminating to the other component. The terminating end 130 may be threaded to receive a nut. In the illustrated embodiment, the terminating end 130 extends through the cover 104 and is located above the cover 104. The mating end 132 is located within the cavity 112 for mating engagement with the movable contact 122, such as when the contactor 100 is energized.

In an exemplary embodiment, the fixed contact 120 includes a plate 134. In the illustrated embodiment, the plate 134 is rectangular in shape; however, the plate 134 may have other shapes in alternative embodiments. The plate 134 may be a metal block, such as an aluminum or copper block. The plate 134 includes generally planar upper and lower surfaces. The bottom surface of the plate 134 has a large surface area, such as for thermal connection with the heat transfer device 200 (shown in FIG. 3).

The fixed contact 120 includes one or more mating posts 136 extending from the plate 134, such as from the upper surface. In an exemplary embodiment, the mating posts 136 are metal posts, such as aluminum or copper posts. The mating posts 136 may be cylindrical having flat upper and lower surfaces. The mating posts 136 are separate and discrete from the plate 134 and coupled thereto. The mating posts 136 may be press-fit into openings in the plate 134.

Alternatively, the mating posts 136 may be rivetted, brazed, soldered, welded or otherwise electrically connected to the plate 134. The mating posts 136 define the mating end 132 at distal ends 137 of the mating posts 136. The mating posts 136 are configured to be coupled to the movable contact 122. For example, movable contact 122 is configured to engage the flat distal ends 137 (for example, upper surfaces) of the mating posts 136. The mating posts 136 are thus electrically and thermally coupled to the plate 134. Dissipating heat from the plate 134 reduces the temperature of the mating posts 136, which may in turn reduce the temperature of the movable contact 122. In an exemplary embodiment, multiple mating posts 136 are provided defining parallel electrical paths between the movable contact 122 and the plate 134. Having multiple mating posts 136 lowers contact resistance through the switch assembly 118, which lowers the operating temperature of the switch assembly 118. By lowering the operating temperature of the plate 134 and the mating posts 136 allows higher current to be passed through the fixed contact 120.

In an exemplary embodiment, the fixed contact 120 includes a terminating post 138 extending from the plate 134, such as from the upper surface. The terminating post 138 may be a metal post, such as a steel, copper or aluminum post. The terminating post 138 may be generally cylindrical. The terminating post 138 defines the terminating end 130. The terminating post 138 may be threaded, such as to receive a nut. The terminating post 138 may be threadably coupled to the plate 134. Alternatively, the terminating post 138 may be press-fit, welded or otherwise coupled to the plate 134. The terminating post 138 is configured to be located exterior of the contactor for electrical connection with a power terminal or a power wire.

The movable contact 122 is movable relative to the fixed contacts 120 between a mated position and an unmated position. The movable contact 122 engages the mating posts 136 in the mated position to electrically connect the first and second fixed contacts 120*a*, 120*b*. In an exemplary embodiment, the movable contact 122 includes a metal plate 140 having planar upper and lower surfaces. The metal plate 140 extends between a first end 142 and a second end 144. The first end 142 is configured to be coupled to the mating posts 136 of the first fixed contact 120*a*. The second end 144 is configured to be coupled to the mating posts 136 of the second fixed contact 120*b*. In the illustrated embodiment, the metal plate 140 overlaps with approximately half of the distal end 137 of each mating post 136. However, the metal plate 140 may overlap with more or less of each mating post 136 in alternative embodiments, such as the entire distal ends 137 to increase the surface area at the interfaces. The metal plate 140 is thermally and electrically coupled to the mating posts 136 in the mated position. The metal plate 140 has a large surface area for high current handling. Optionally, the metal plate 140 may have a width approximately equal to widths of the plates 134. The metal plate 140 may have a thickness approximately equal to thicknesses of the plates 134.

Figure 7:
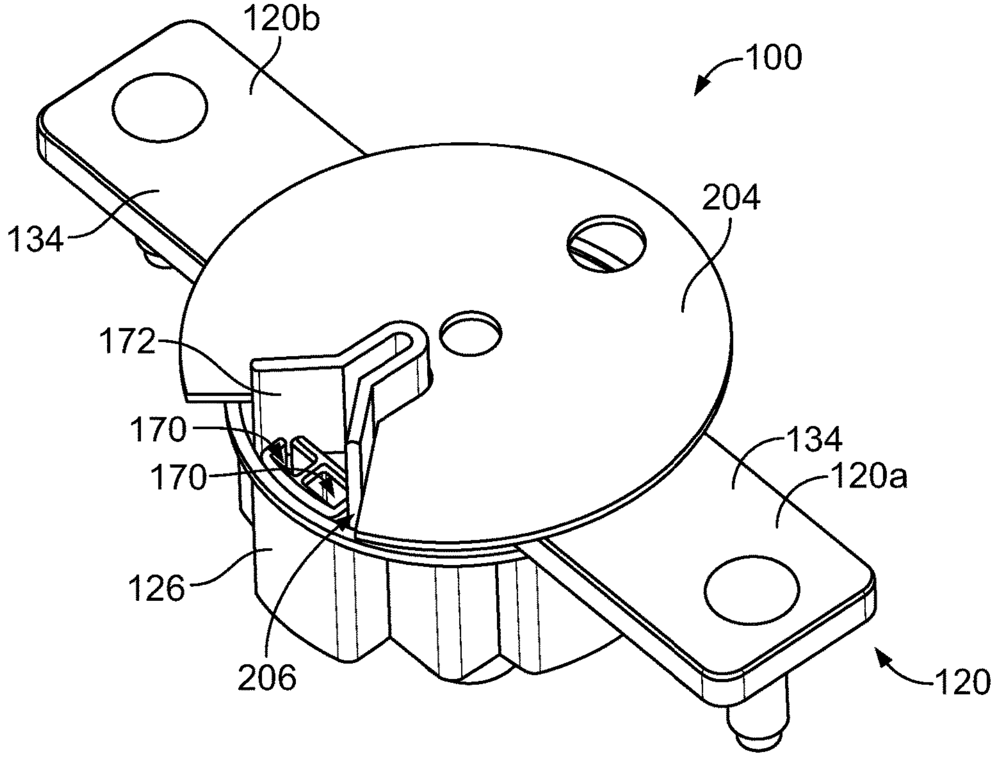
FIG. 7 is a bottom perspective view of a portion of the contactor showing a thermally conductive isolator coupled to fixed contacts and a contact holder in accordance with an exemplary embodiment.
Figure 8:
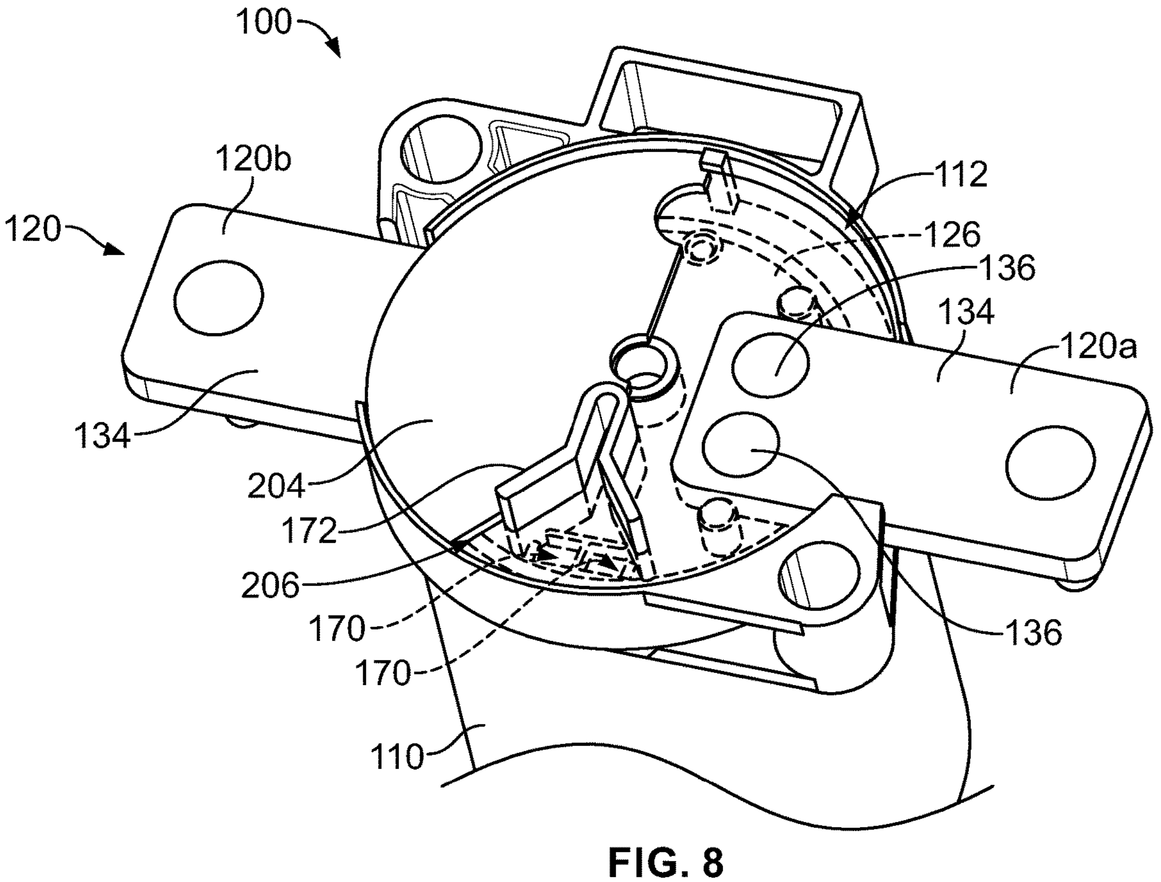
FIG. 8 is a bottom perspective view of a portion of the contactor showing the thermally conductive isolator sectioned and partially removed to illustrate the fixed contact and the contact holder in accordance with an exemplary embodiment.

FIG. 7 is a bottom perspective view of a portion of the contactor 100 showing the thermally conductive isolator 204 coupled to the fixed contacts 120 and the contact holder 126. FIG. 8 is a bottom perspective view of a portion of the contactor 100 showing the thermally conductive isolator 204 sectioned and partially removed to illustrate the fixed contact 120 and the contact holder 126. In an exemplary embodiment, the thermally conductive isolator 204 is a disc configured to be coupled to the contact holder 126 to provide electrical isolation between the fixed contacts 120 and the thermal conductor 202 (shown in FIG. 3).

In an exemplary embodiment, the contact holder 126 includes channels 170 passing therethrough. The channels 170 may receive contacts and/or wires for supplying power to the coil assembly 150 (shown in FIG. 3). The channels 170 allow the wires to exit the contactor 100, such as for connection to a control circuit. The contact holder 126 includes a separating wall 172 surrounding the channels 170. The separating wall 172 provides electrical isolation from the wires/contacts and the fixed contacts 120. The separating wall 172 prevents short circuiting and/or arcing. The thermally conductive isolator 204 includes a notch 206 the receives the separating wall 172 and the wires exiting the channels 170.

The thermally conductive isolator 204 covers portions of the fixed contacts 120. For example, the thermally conductive isolator 204 covers portions of the plates 134. The thermally conductive isolator 204 covers the ends of the mating posts 136. The interface between the mating posts 136 and the plates 134 are hot spots where significant heat generation occurs. The thermally conductive isolator 204 covers the hot spots. The thermally conductive isolator 204 is thermally coupled to the fixed contacts 120 at the spots. The thermally conductive isolator 204 is used as a heat spreader to spread heat from the fixed contacts 120 to the thermal conductor 202 (shown in FIG. 3). In an exemplary embodiment, the end of the cavity 112 of the housing 110 may be filled with potting material, such as around the contact holder 126 and the fixed contacts 120. The potting material may be thermally conductive. The thermally conductive isolator 204 may be thermally coupled to the potting material to draw heat out of the contactor 100.

Figure 9:
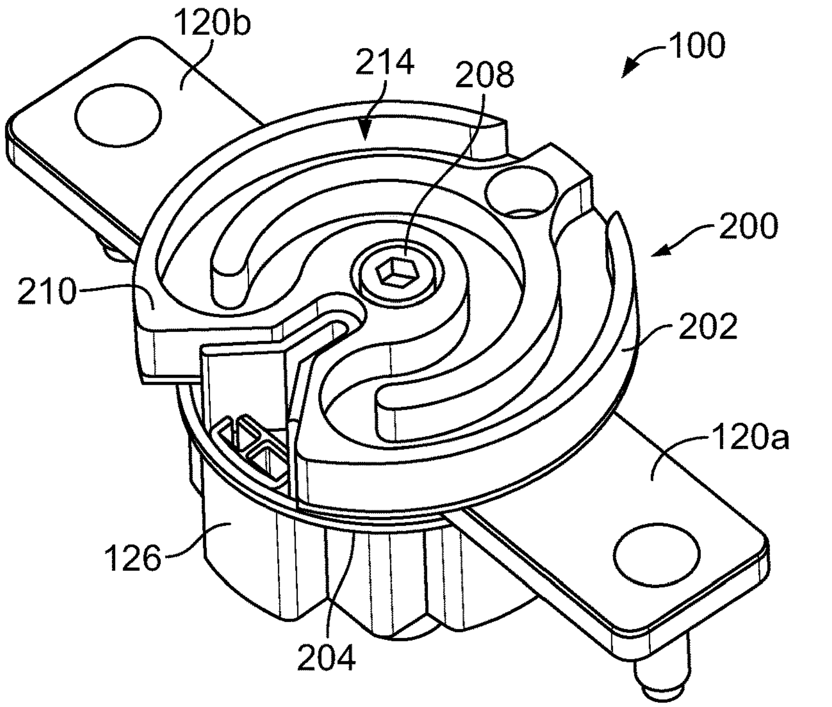
FIG. 9 is a bottom perspective view of a portion of the contactor showing a thermal conductor coupled to the thermally conductive isolator and the contact holder in accordance with an exemplary embodiment.
Figure 10:
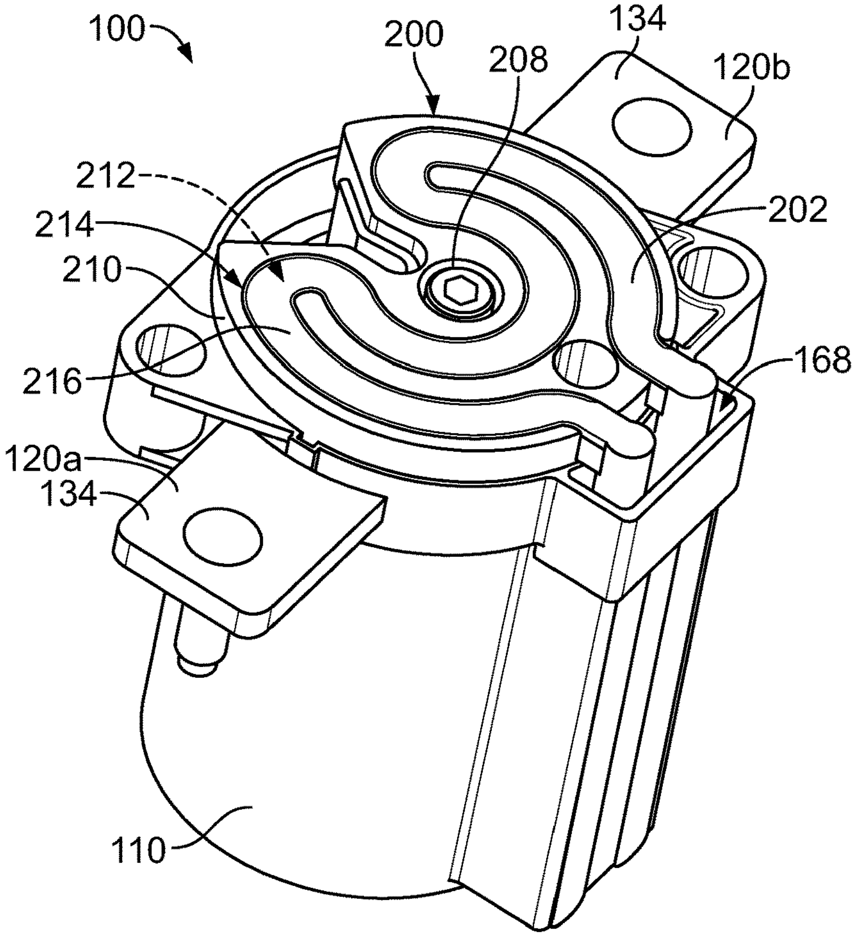
FIG. 10 is a bottom perspective view of a portion of the contactor showing the thermal conductor coupled to the housing in accordance with an exemplary embodiment.
Figure 11:
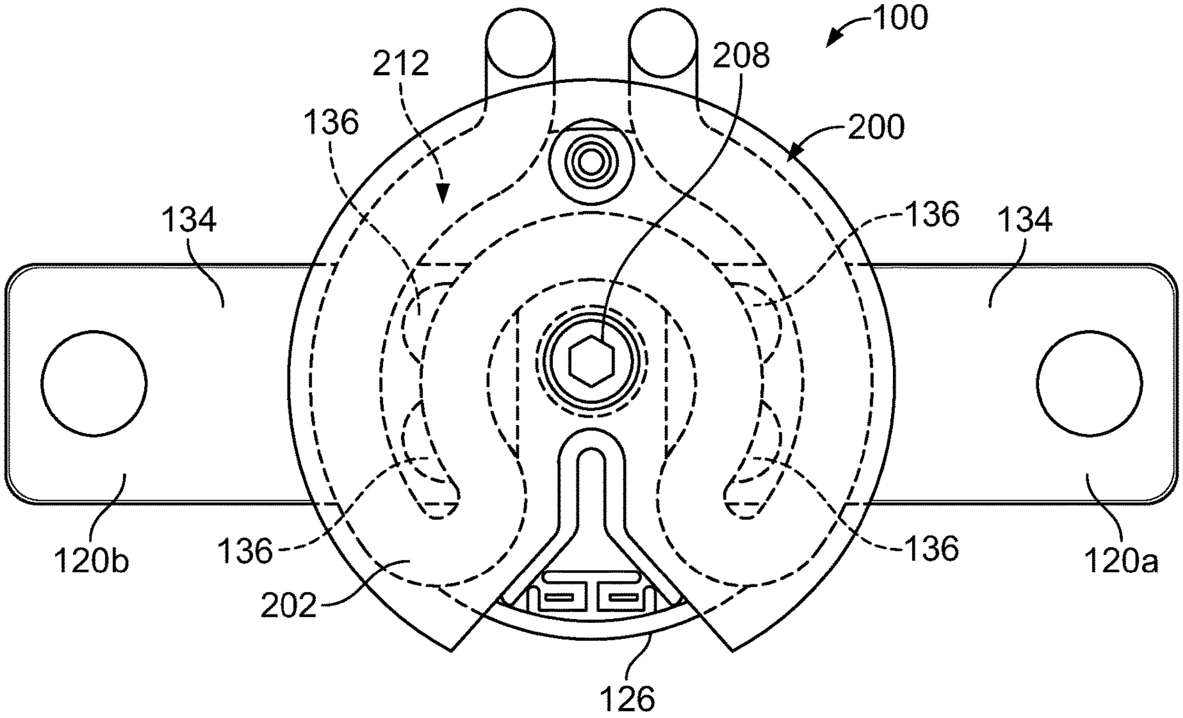
FIG. 11 is a bottom view of a portion of the contactor showing the thermal conductor thermally coupled to the first and second fixed contacts in accordance with an exemplary embodiment.

FIG. 9 is a bottom perspective view of a portion of the contactor 100 showing the thermal conductor 202 coupled to the thermally conductive isolator 204 and the contact holder 126. FIG. 10 is a bottom perspective view of a portion of the contactor 100 showing the thermal conductor 202 coupled to the housing 110. FIG. 11 is a bottom view of a portion of the contactor 100 showing the thermal conductor 202 thermally coupled to the first and second fixed contacts 120*a*, 120*b*. The heat transfer device 200 is incorporated into the contactor 100 to dissipate heat from components of the contactor 100. The reduction in operating temperature of the components of the contactor 100 allows for increased current carrying capacity of the contactor 100. The heat transfer device 200 may be secured to the contact holder 126 using a fastener 208, such as a threaded fastener. The fastener 208 provides secure retention and may provide a compressive load to the thermal circuit between the heat transfer device 200 and the first and second fixed contacts 120*a*, 120*b*.

In the illustrated embodiment, the thermal conductor 202 of the heat transfer device 200 includes a cold plate 210 having a coolant channel 212 therethrough. The cold plate 210 includes thermal interfaces thermally coupled to the first and second fixed contacts 120*a*, 120*b* with aid of coolant fluid flowing through the coolant channel 212. In the illustrated embodiment, the cold plate 210 is disc shaped. The cold plate 210 has a similar shape as the thermally conductive isolator 204. The cold plate 210 may have other shapes in alternative embodiments.

In various embodiments, the cold plate 210 includes a cavity 214 and a pipe 216 received in the cavity 214. The pipe 216 defines the coolant channel 212. The pipe 216 may be routed to an exterior of the cold plate 210 for connection with a coolant supply, such as using liquid fittings. For example, the ends of the pipe 216 may be routed through the secondary cavity 168, such as to a location remote from the contactor 100. In alternative embodiments, the cold plate 210 may be provided without the pipe 216. Rather, the cavity 214 itself may define the coolant channel 212. For example, a cover plate (not shown) may be brazed to the bottom of the cold plate 210 to close the cavity 214 and form the coolant channel 212.

The cold plate 210 includes a metal block. For example, the cold plate 210 may be an aluminum block or a copper block. The pipe 216 may be a copper pipe. Optionally, thermal paste or other thermal interface material may be provided between the pipe 216 and the cold plate 210. In other embodiments, the pipe 216 may be brazed to the cold plate 210. In the illustrated embodiment, the cavity 214 and the pipe 216 follow a serpentine path to provide a large amount of interface between the pipe 216 and the cold plate 210. The serpentine path allows for a long coolant channel length per surface area for improved thermal conduction from the thermal conductor 202 to the liquid coolant forced through the coolant channel 212. In an exemplary embodiment, the path of the cavity 214 and the pipe 216 passes in close proximity to the hot spots generated at the interfaces between the mating posts 136 and the plates 134. The pipe 216 may have other shapes in alternative embodiments.

Figure 12:
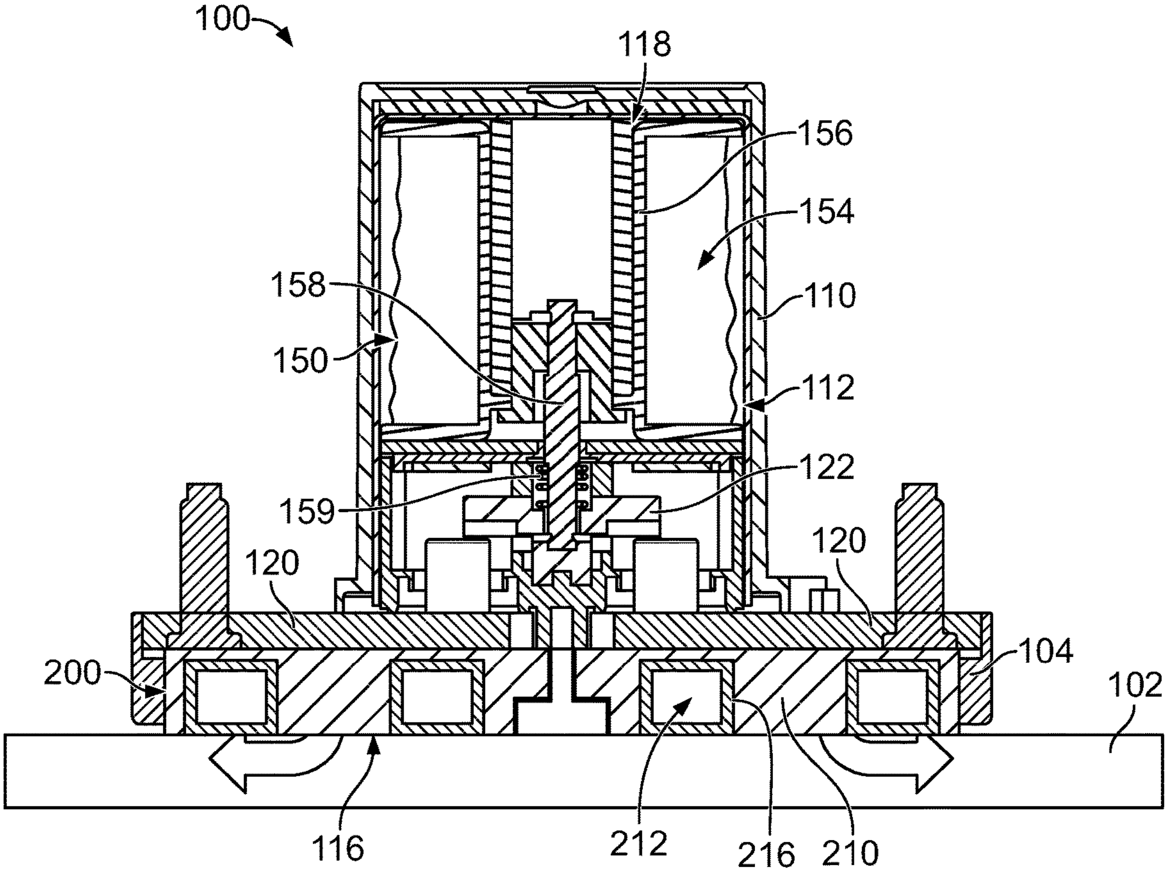
FIG. 12 is a cross sectional view of the contactor in accordance with an exemplary embodiment.

FIG. 12 is a cross sectional view of the contactor 100 in accordance with an exemplary embodiment. The contactor 100 includes the heat transfer device 200 used to dissipate heat from the switch assembly 118 of the contactor 100. The switch assembly 118 includes the coil assembly 150 in the cavity 112 operated to move the movable contact 122 between the unmated position and the mated position. The coil assembly 150 includes a winding or coil 154 wound around a core 156 to form an electromagnet. The coil assembly 150 includes a plunger 158 coupled to the core 156. The movable contact 122 is coupled to the plunger 158 and is movable with the plunger 158 when the coil assembly 150 is operated. The coil assembly 150 includes a spring 159 for returning the movable contact 122 to the unmated position when the coil assembly 150 is deenergized.

The fixed contacts 120 are provided at the bottom 116 of the contactor 100. The cover 104 is coupled to the housing 110 at the bottom 116. The cover 104 may hold the fixed contacts 120 and/or the heat transfer device 200. The heat transfer device 200 is in thermal communication with the fixed contacts 120 to dissipate heat from the fixed contacts 120, and thus from the movable contact 122. The reduced operating temperatures of the components of the contactor 100 allow for an increased current carrying capacity for the circuit. The pipe 216 defines the coolant channel 212 for liquid coolant to flow through the cold plate 210 and transfer the heat away from the contactor 100. In an exemplary embodiment, the heat transfer device 200 may additional transfer heat into the mounting structure 102, which may be a heat sink or cold plate itself.

Figure 13:
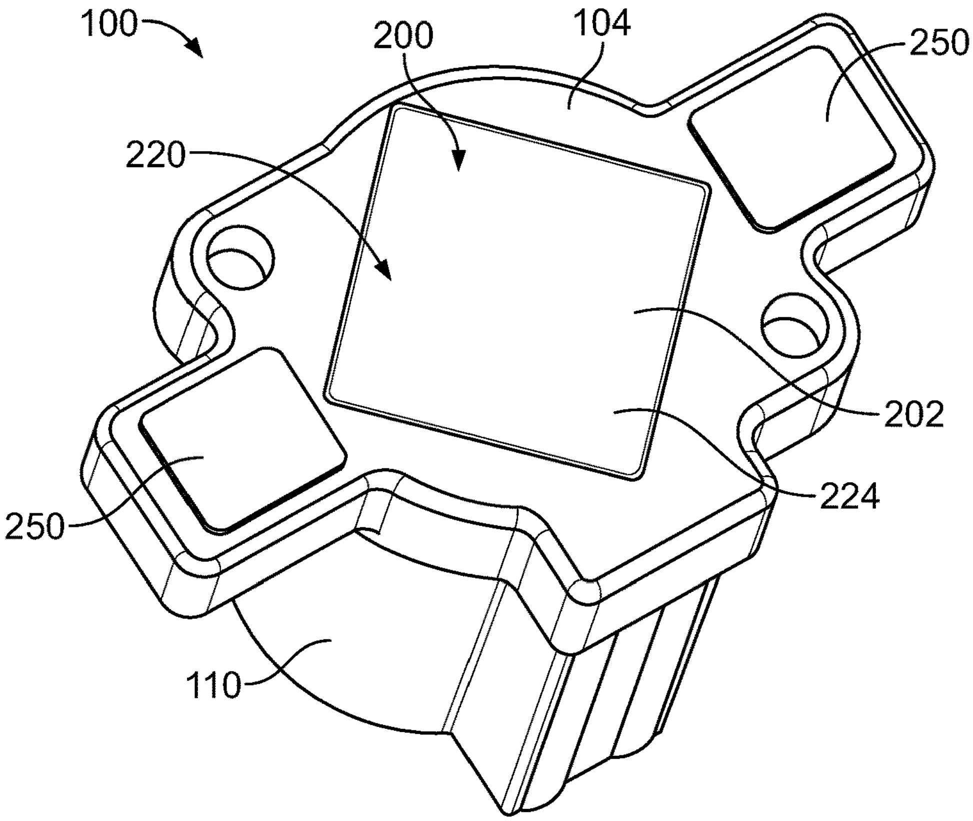
FIG. 13 is a bottom perspective view of the contactor in accordance with an exemplary embodiment.
Figure 14:
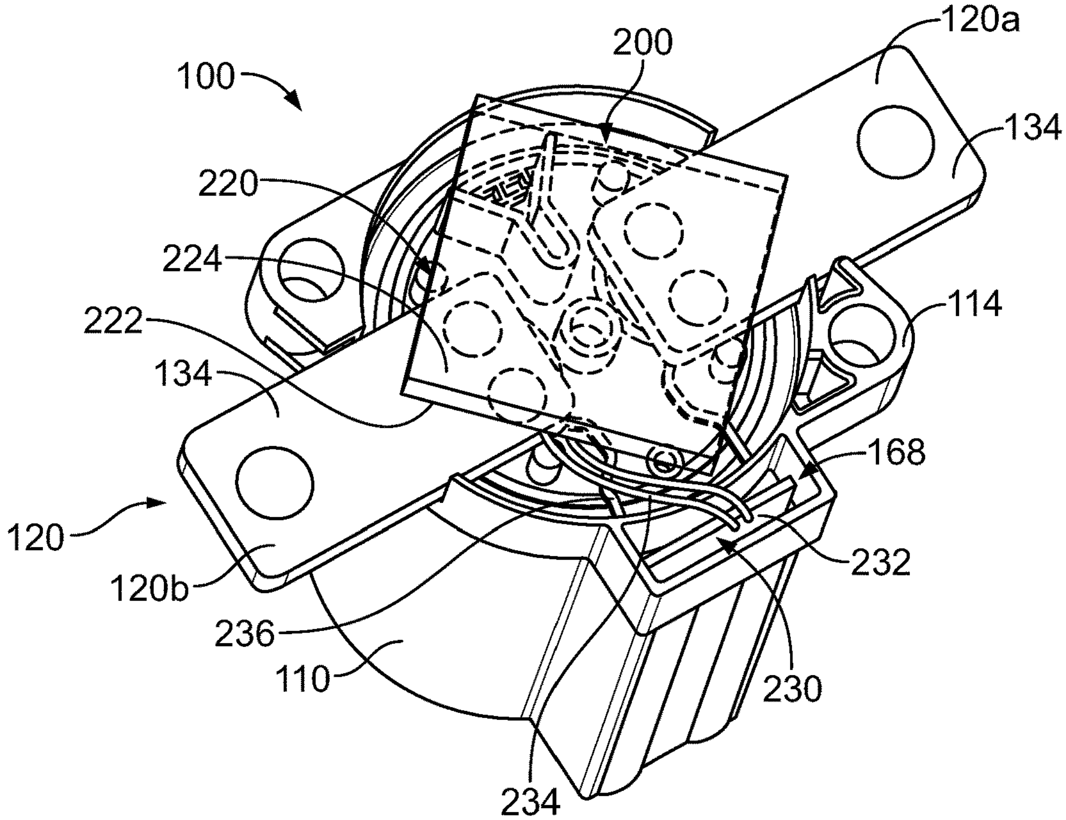
FIG. 14 is a bottom perspective view of the contactor in accordance with an exemplary embodiment with a cover removed to illustrate internal components of the contactor.

FIG. 13 is a bottom perspective view of the contactor 100 in accordance with an exemplary embodiment. FIG. 14 is a bottom perspective view of the contactor 100 in accordance with an exemplary embodiment with the cover 104 removed to illustrate internal components of the contactor 100. In the illustrated embodiment, the thermal conductor 202 of the heat transfer device 200 includes a thermoelectric cooling device 220, such as a peltier device, for cooling the fixed contacts 120 rather than a cold plate. In an exemplary embodiment, the thermal conductor 202 of the heat transfer device additionally includes thermal pads 250 configured to be thermally coupled to the fixed contacts 120. The thermal pads 250 may be passive cooling elements that transfer heat from the fixed contacts 120 through conduction and dissipate the heat into the environment, such as through conduction, convection and/or radiation.

The thermoelectric cooling device 220 is held by the cover 104 and positioned in close proximity with the fixed contacts 120. The thermoelectric cooling device 220 includes upper thermal interfaces 222 configured to be thermally coupled to the fixed contacts 120 and a lower thermal interface 224 configured to dump heat from the thermoelectric cooling device 220. The upper thermal interfaces 222 are configured to be operated at different temperatures than the lower thermal interface 224. The thermoelectric cooling device 220 is manufactured from two different types of materials and creates heat flux at the junction between the two different materials. The thermoelectric cooling device 220 uses electrical energy to drive the cooling effect of the thermoelectric cooling device 220. In the illustrated embodiment, the thermoelectric cooling device 220 is rectangular in shape; however, the thermoelectric cooling device 220 may have other shapes in alternative embodiments, such as a shape similar to the shape of the fixed contacts 120 such that the thermoelectric cooling device 220 spans along the bottom surfaces of the plates 134 to entirely cover the bottom surfaces of the plates 134 of the fixed contacts 120. In various embodiments, the thermoelectric cooling device 220 may be disc shaped, such as to cover the base 114 of the housing 110 and have a large surface area for sinking the heat from the thermoelectric cooling device 220.

In an exemplary embodiment, the thermoelectric cooling device 220 includes a control circuit 230 electrically coupled to the thermoelectric cooling device 220 to control the thermoelectric cooling device 220. The control circuit 230 includes a circuit board 232 held in the housing 110, such as in the secondary cavity 168. The control circuit 230 includes wires 234 coupled to the thermoelectric cooling device 220 and the circuit board 232. In an exemplary embodiment, the control circuit 230 receives a power supply 236 to power the thermoelectric cooling device 220. The power supply 236 may be provided from the first and second fixed contacts **120*a*, 120*b*. For example, the circuit board 232 is electrically coupled to the first and second fixed contacts 120*a*, 120*b* to draw power from the first and second fixed contacts 120*a*, 120*b* to operate the control circuit 230. Alternatively, the power supply 236** may be from another power supply.

Figure 15:
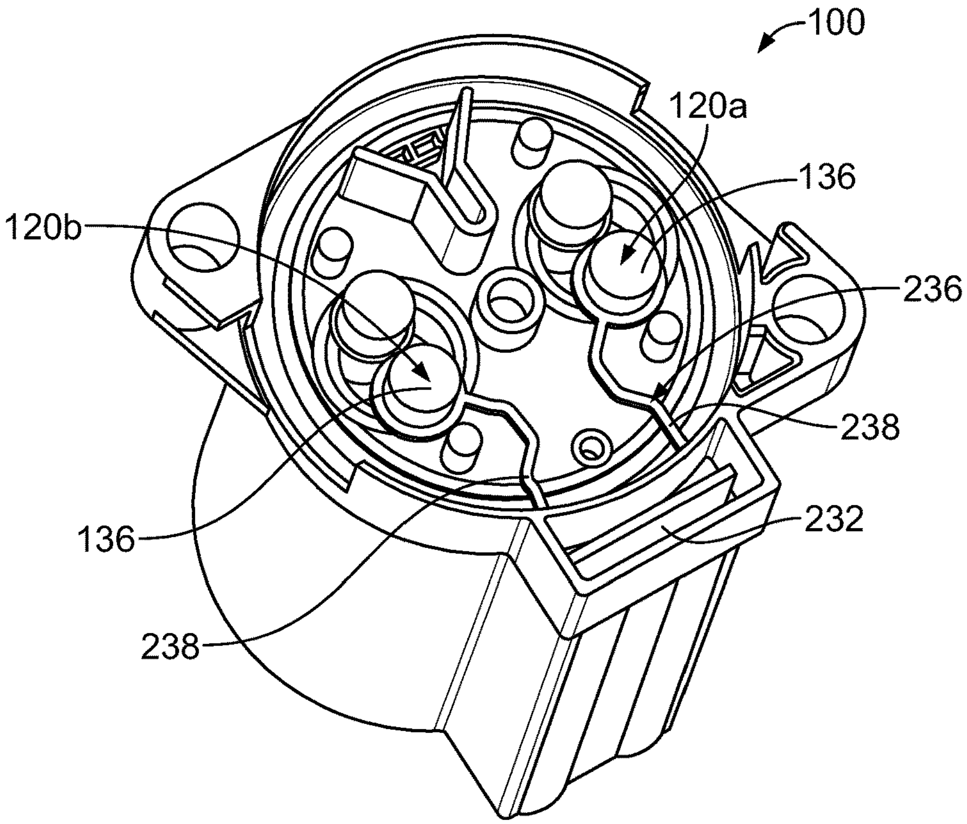
FIG. 15 is a bottom perspective view of the contactor in accordance with an exemplary embodiment with the cover and the thermoelectric cooling device removed to illustrate internal components of the contactor.

FIG. 15 is a bottom perspective view of the contactor 100 in accordance with an exemplary embodiment with the cover 104 and the thermoelectric cooling device 220 removed to illustrate internal components of the contactor 100. The thermoelectric cooling device 220 includes contacts 238 coupled to the first and second fixed contacts **120*a*, 120*b*, such as to the mating posts 136. The contacts 238 form the power supply 236. The contacts 238 supply power to the circuit board 232 for powering the thermoelectric cooling device 220 (FIG. 14**).

Figure 16:
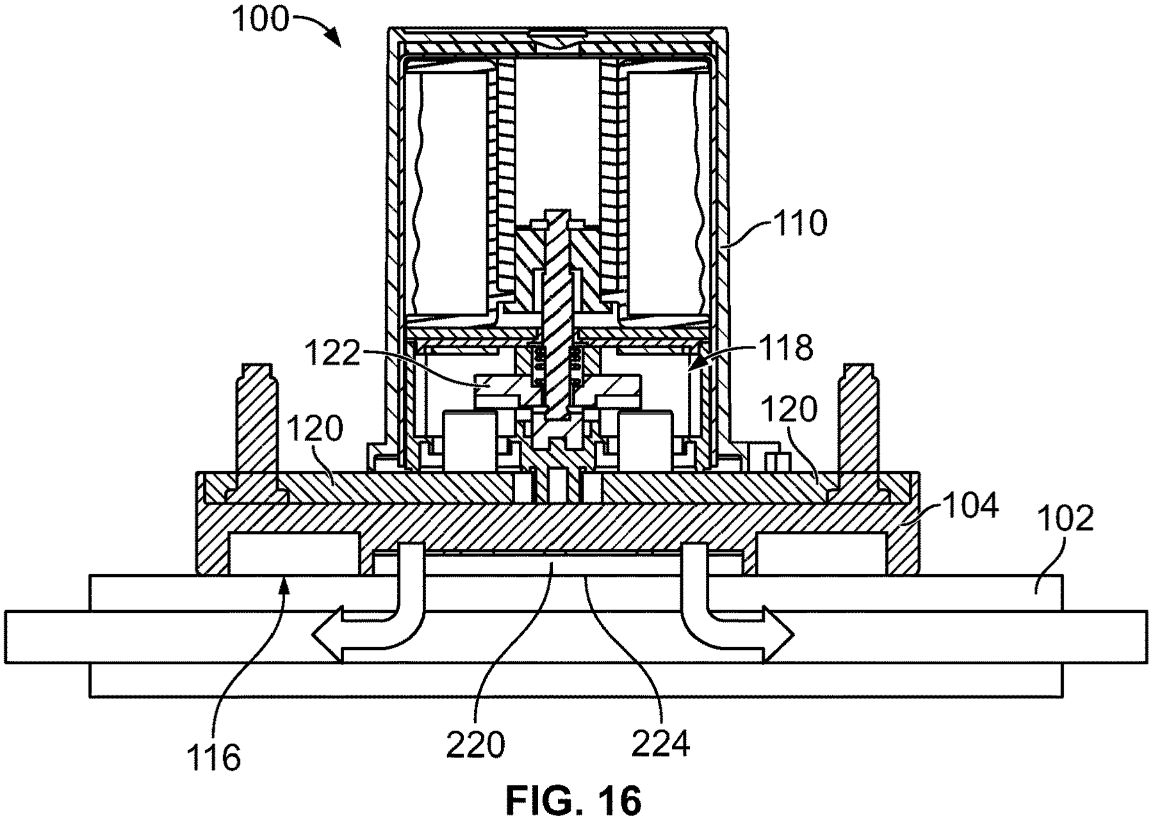
FIG. 16 is a cross sectional view of the contactor in accordance with an exemplary embodiment.

FIG. 16 is a cross sectional view of the contactor 100 in accordance with an exemplary embodiment. The contactor 100 includes the thermoelectric cooling device 220 to dissipate heat from the switch assembly 118 of the contactor 100. The fixed contacts 120 are provided at the bottom 116 of the contactor 100. The cover 104 is coupled to the housing 110 at the bottom 116. The cover 104 may hold the fixed contacts 120 and/or the thermoelectric cooling device 220. In the illustrated embodiment, the cover 104 defines a heat spreader between the thermoelectric cooling device 220 and the fixed contacts 120. The cover 104 is highly thermally conductive to efficiently transfer heat from the fixed contacts

120 to the thermoelectric cooling device 220. The cover 104 is an electrical isolator to electrically insulate the fixed contacts 120 from the thermoelectric cooling device 220. The thermoelectric cooling device 220 is in thermal communication with the fixed contacts 120 to dissipate heat from the fixed contacts 120, and thus from the movable contact 122. The reduced operating temperatures of the components of the contactor 100 allow for an increased current carrying capacity for the circuit. In an exemplary embodiment, the lower thermal interface 224 defines a sink interface that transfers heat from the thermoelectric cooling device 220 into the mounting structure 102, which may be a heat sink or cold plate.

Figure 17:
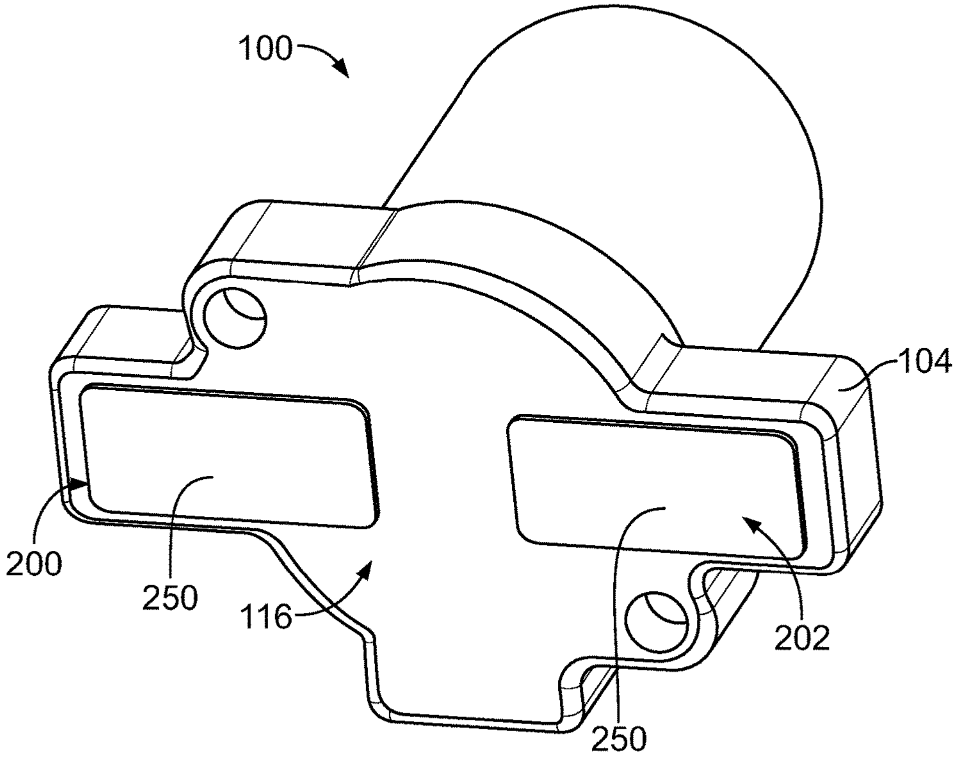
FIG. 17 is a bottom perspective view of the contactor in accordance with an exemplary embodiment.

FIG. 17 is a bottom perspective view of the contactor 100 in accordance with an exemplary embodiment. In the illustrated embodiment, the thermal conductor 202 of the heat transfer device 200 includes the thermal pads 250 thermally coupled to the fixed contacts 120, rather than a cold plate or peltier device. The thermal pads 250 may be passive cooling elements that transfer heat from the fixed contacts 120 through conduction and dissipate the heat into the environment, such as through conduction, convection and/or radiation.

The thermal pads 250 are set in the cover 104. The thermal pads 250 are manufactured from a thermally conductive material. For example, the thermal pads 250 may be metal blocks, such as aluminum blocks. Alternatively, the thermal pads 250 may be ceramic blocks or manufactured from other thermally conductive materials. The thermal pads 250 may be rectangular, such as having a size and shape that compliments the size and shape of the fixed contacts 120. The thermal pads 250 are exposed at the bottom 116 of the contactor 100, such as for connection to the mounting structure 102 or for exposure into the surrounding environment, such as to dissipate the heat into the air surrounding the contactor 100.

Figure 18:
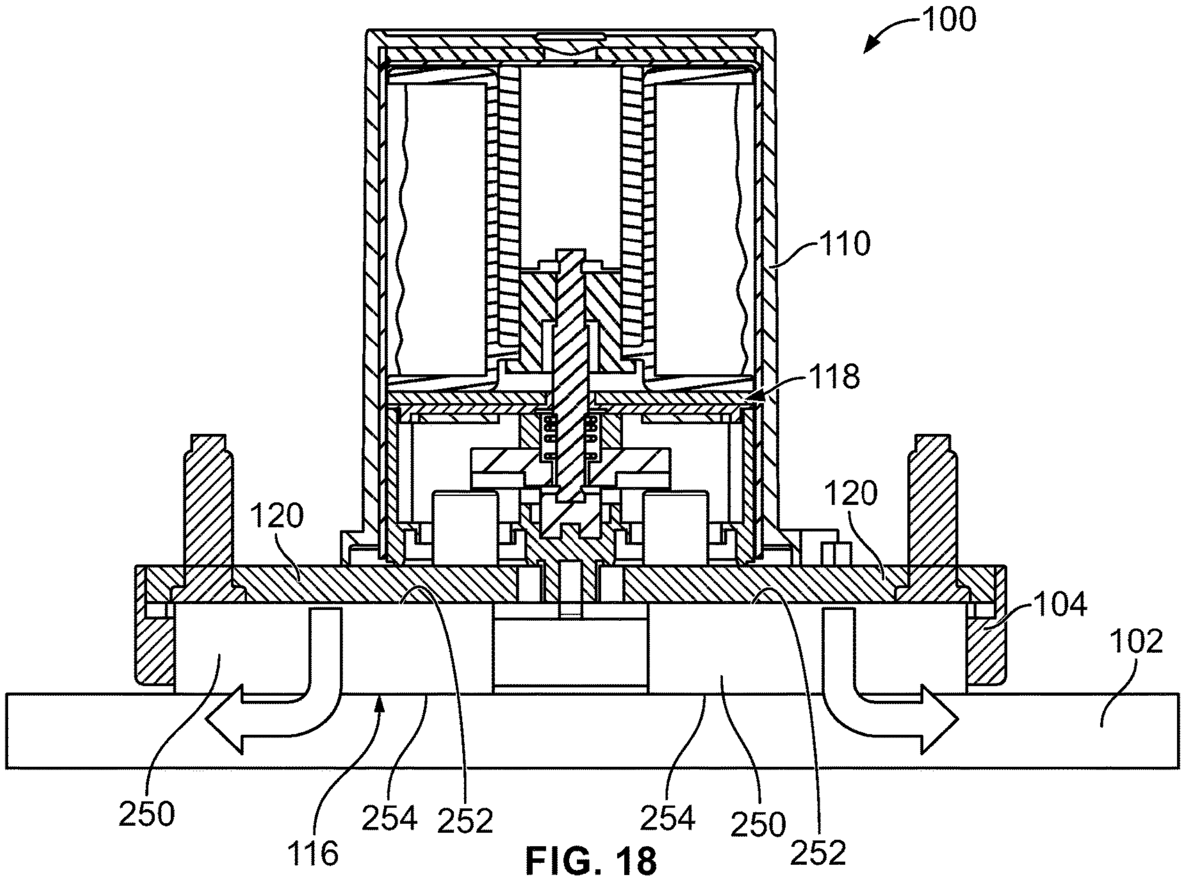
FIG. 18 is a cross sectional view of the contactor in accordance with an exemplary embodiment.

FIG. 18 is a cross sectional view of the contactor 100 in accordance with an exemplary embodiment. The contactor 100 includes the thermal pads 250 to dissipate heat from the switch assembly 118 of the contactor 100. The fixed contacts 120 are provided at the bottom 116 of the contactor 100. The cover 104 is coupled to the housing 110 at the bottom 116. The cover 104 may hold the fixed contacts 120 and/or the thermal pads 250. The thermal pads 250 include upper thermal interfaces 252 configured to be thermally coupled to the fixed contacts 120 and lower thermal interfaces 254 configured to be thermally coupled to the mounting structure 102 (or alternatively to air below the contactor 100). In an exemplary embodiment, the upper thermal interfaces 252 directly engage the fixed contacts 120 for direct thermal conduction between the thermal pads 250 and the fixed contacts 120. Alternatively, the thermal pads 250 may be indirectly thermally coupled to the fixed contacts 120, such as through the cover 104 or other thermal interface material or component.

Figure 19:
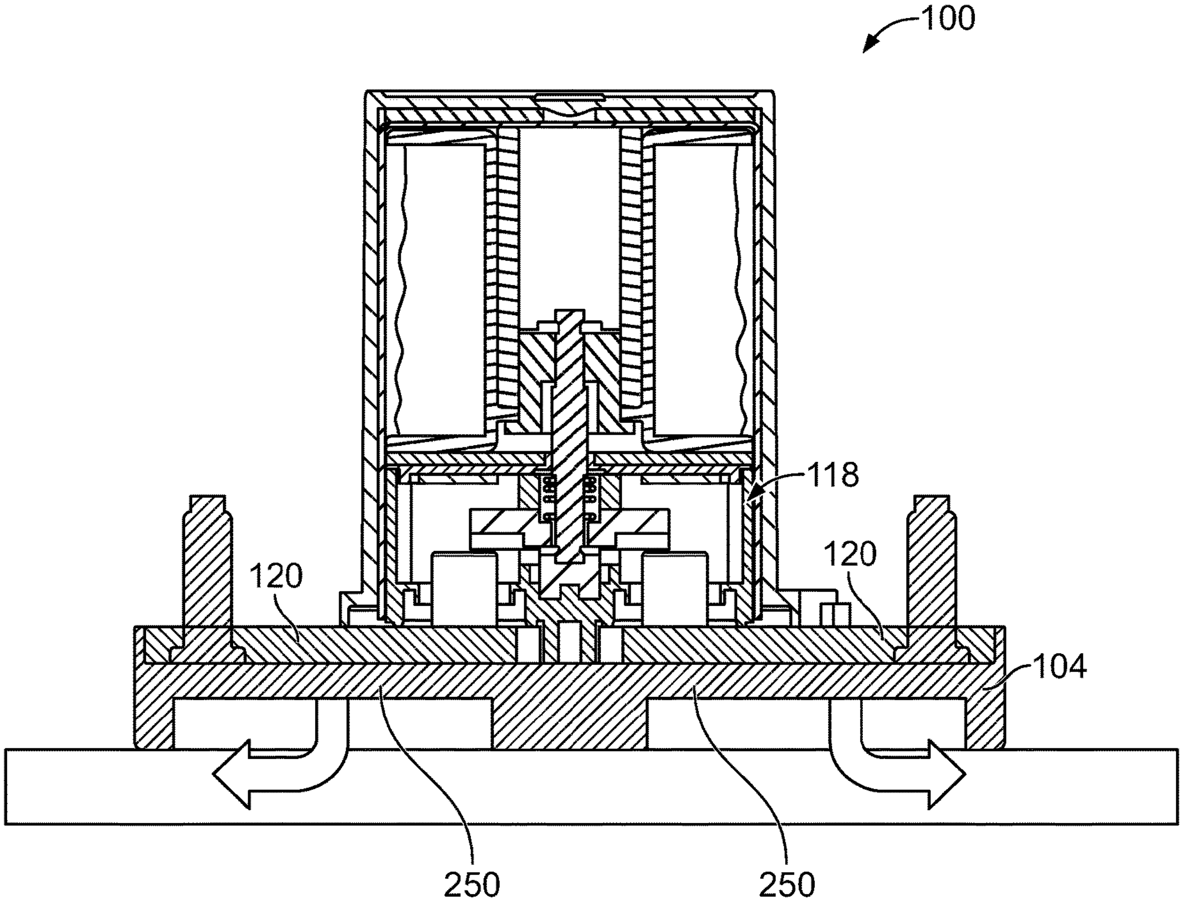
FIG. 19 is a cross sectional view of the contactor in accordance with an exemplary embodiment.

FIG. 19 is a cross sectional view of the contactor 100 in accordance with an exemplary embodiment. The contactor 100 includes the thermal pads 250 to dissipate heat from the switch assembly 118 of the contactor 100. The thermal pads 250 are indirectly thermally coupled to the fixed contacts 120 through the cover 104 in the illustrated embodiment. For example, the cover 104 defines a heat spreader between the thermal pads 250 and the fixed contacts 120. The cover 104 is highly thermally conductive to efficiently transfer heat from the fixed contacts 120 to the thermal pads 250. The cover 104 is an electrical isolator to electrically insulate the fixed contacts 120 from the thermal pads 250.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A contactor comprising:

a housing having an outer wall defining a cavity, the housing having a first end and a second end opposite the first end;

a switch assembly received in the cavity, the switch assembly including a first fixed contact received in the cavity and a second fixed contact received in the cavity, the switch assembly including a movable contact movable within the cavity between a mated position and an unmated position, the movable contact engaging the first and second fixed contacts to electrically connect the first and second fixed contacts in the mated position, the switch assembly including a coil assembly in the cavity operated to move the movable contact between the unmated position and the mating position; and a heat transfer device coupled to the housing, the heat transfer device being thermally coupled to the first fixed contact and the second fixed contact to dissipate heat from the first fixed contact and the second fixed contact.

2. The contactor of claim 1, wherein the heat transfer device directly interfaces with the first and second fixed contacts to dissipate heat from the first and second fixed contacts.

3. The contactor of claim 1, wherein the heat transfer device includes a thermal conductor and a thermally conductive isolator between the thermal conductor and the first and second fixed contacts, the thermally conductive isolator being electrically insulative.

4. The contactor of claim 1, further comprising a cover coupled to the housing, the cover including a main pocket holding the heat transfer device.

5. The contactor of claim 4, wherein the cover is manufactured from a thermally conductive material to dissipate heat from the first and second fixed contacts.

6. The contactor of claim 1, wherein the first fixed contact includes a first plate and a mating post extending from the first plate, the first plate being generally planar and having a first thermal interface, the mating post extending from the first plate to interface with the movable contact, and wherein the second fixed contact includes a second plate and a mating post extending from the second plate, the second plate being generally planar and having a second thermal interface, the mating post extending from the second plate to interface with the movable contact, the heat transfer device being thermally coupled to the first and second thermal interfaces to dissipate heat from the first and second fixed contacts.

7. The contactor of claim 6, wherein the first fixed contact includes a plurality of mating posts extending from the first plate for interfacing with the movable contact and the second fixed contact includes a plurality of mating posts extending from the second plate for interfacing with the movable contact.

8. The contactor of claim 1, wherein the heat transfer device includes a cold plate having a coolant channel therethrough, the cold plate including a thermal interface thermally coupled to the first fixed contact and the second fixed contact to dissipate heat from the first fixed contact and the second fixed contact with aid of coolant fluid flowing through the coolant channel.

9. The contactor of claim 8, wherein the cold plate includes a cavity and a pipe received in the cavity, the pipe defining the coolant channel, the pipe extending to an exterior of the cold plate for connection with a coolant supply.

10. The contactor of claim 8, wherein the cold plate is a metal block, the heat transfer device further comprising a thermally conductive isolator between the cold plate and the first and second fixed contacts.

11. The contactor of claim 1, wherein the heat transfer device includes a peltier device having a thermal interface thermally coupled to the first fixed contact and the second fixed contact, the peltier device using thermoelectric cooling to dissipate heat from the first fixed contact and the second fixed contact.

12. The contactor of claim 11, wherein the heat transfer device includes a control circuit electrically coupled to the peltier device to control the peltier device, the control circuit being electrically coupled to the first and second fixed contacts to draw power from the first and second fixed contacts to operate the control circuit.

13. The contactor of claim 11, wherein the peltier device includes a sink interface configured to be thermally coupled to a heat sink to transfer heat from the peltier device.

14. The contactor of claim 1, wherein the housing is configured to be coupled to a heat sink, the heat transfer device includes a first thermal pad having an upper surface and a lower surface, the upper surface being thermally coupled to the first fixed contact, the lower surface configured to be thermally coupled to the heat sink to transfer heat from the first thermal pad, the heat transfer device includes a second thermal pad having an upper surface and a lower surface, the upper surface being thermally coupled to the second fixed contact, the lower surface configured to be thermally coupled to the heat sink to transfer heat from the second thermal pad.

15. A contactor comprising:

a housing having an outer wall defining a cavity, the housing having a first end and a second end opposite the first end;

a switch assembly received in the cavity, the switch assembly including a first fixed contact received in the cavity and a second fixed contact received in the cavity, the switch assembly including a movable contact movable within the cavity between a mated position and an unmated position, the movable contact engaging the first and second fixed contacts to electrically connect the first and second fixed contacts in the mated position, the switch assembly including a coil assembly in the cavity operated to move the movable contact between the unmated position and the mating position; and a heat transfer device coupled to the housing, the heat transfer device including a cold plate having a coolant channel therethrough, the cold plate including a thermal interface thermally coupled to the first fixed contact and the second fixed contact to dissipate heat from the first fixed contact and the second fixed contact with aid of coolant fluid flowing through the coolant channel.

16. The contactor of claim 15, wherein the cold plate includes a cavity and a pipe received in the cavity, the pipe defining the coolant channel, the pipe extending to an exterior of the cold plate for connection with a coolant supply.

17. The contactor of claim 15, wherein the cold plate is a metal block, the heat transfer device further comprising a thermally conductive isolator between the cold plate and the first and second fixed contacts.

18. A contactor comprising:

a housing having an outer wall defining a cavity, the housing having a first end and a second end opposite the first end;

a switch assembly received in the cavity, the switch assembly including a first fixed contact received in the cavity and a second fixed contact received in the cavity, the switch assembly including a movable contact movable within the cavity between a mated position and an unmated position, the movable contact engaging the first and second fixed contacts to electrically connect the first and second fixed contacts in the mated position, the switch assembly including a coil assembly in the cavity operated to move the movable contact between the unmated position and the mating position; and a heat transfer device coupled to the housing, the heat transfer device including a peltier device having a thermal interface thermally coupled to the first fixed contact and the second fixed contact, the peltier device using thermoelectric cooling to dissipate heat from the first fixed contact and the second fixed contact.

19. The contactor of claim 18, wherein the heat transfer device includes a control circuit electrically coupled to the peltier device to control the peltier device, the control circuit being electrically coupled to the first and second fixed contacts to draw power from the first and second fixed contacts to operate the control circuit.

20. The contactor of claim 18, wherein the peltier device includes a sink interface configured to be thermally coupled to a heat sink to transfer heat from the peltier device.

* * * * *